US010974754B2

(12) United States Patent
Choi

(10) Patent No.: US 10,974,754 B2
(45) Date of Patent: Apr. 13, 2021

(54) BABY CARRIAGE WITH STORAGE BASKET AND CANOPY

(71) Applicant: BRAN-NEW INTERNATIONAL, Seoul (KR)

(72) Inventor: Yejin Choi, Sacheon-Si (KR)

(73) Assignee: BRAN-NEW INTERNATIONAL, Seoul (KR)

( * ) Notice: Subject to any disclaimer, the term of this patent is extended or adjusted under 35 U.S.C. 154(b) by 0 days.

(21) Appl. No.: 16/957,549

(22) PCT Filed: Feb. 27, 2019

(86) PCT No.: PCT/KR2019/002357
§ 371 (c)(1),
(2) Date: Jun. 24, 2020

(87) PCT Pub. No.: WO2019/168339
PCT Pub. Date: Sep. 6, 2019

(65) Prior Publication Data
US 2020/0406949 A1    Dec. 31, 2020

(30) Foreign Application Priority Data

Feb. 27, 2018   (KR) ........................ 10-2018-0023823

(51) Int. Cl.
*B62B 3/00*     (2006.01)
*B62B 7/00*     (2006.01)
(Continued)

(52) U.S. Cl.
CPC ................ *B62B 7/008* (2013.01); *B62B 9/14* (2013.01); *B62B 9/24* (2013.01); *B62B 9/28* (2013.01);
(Continued)

(58) Field of Classification Search
CPC .......... B62B 7/00; B62B 7/008; B62B 7/006; B62B 7/06; B62B 7/04; B62B 7/145;
(Continued)

(56) References Cited

U.S. PATENT DOCUMENTS 4,272,100 A * 6/1981 Kassai ...................... B62B 7/08
280/47.4
5,184,835 A * 2/1993 Huang ...................... B62B 9/20
16/436
(Continued)

FOREIGN PATENT DOCUMENTS

JP      2009-073479 A    4/2009
KR   10-2015-0023262 A    3/2015
(Continued)

*Primary Examiner* — James M Dolak
(74) *Attorney, Agent, or Firm* — Novick, Kim & Lee, PLLC; Jae Yoon Kim

(57) ABSTRACT

Proposed is a baby carriage having improved convenience of use, the baby carriage including a main frame, a seat frame, a storage basket, and a wheel unit, wherein the baby carriage is generally used as a single baby carriage and a seat is detachably coupled to the rear of the single baby carriage such that the single baby carriage is utilized as a twin baby carriage when a second baby is born, and wherein it is possible to carry a pet in the baby carriage irrespective of carrying a baby or an infant in the baby carriage, whereby the baby carriage is used in various forms depending on circumstances of a user or a home.

6 Claims, 16 Drawing Sheets

(51) Int. Cl.
*B62B 9/14* (2006.01)
*B62B 9/28* (2006.01)
*B62B 9/24* (2006.01)

(52) U.S. Cl.
CPC ....... *B62B 2205/02* (2013.01); *B62B 2205/20* (2013.01); *B62B 2206/006* (2013.01)

(58) Field of Classification Search
CPC .. B62B 7/147; B62B 7/14; B62B 9/12; B62B 9/14; B62B 9/24; B62B 9/245; B62B 9/26; B62B 9/28; B62B 9/00; B62B 9/102; B62B 9/104; B62B 9/106; B62B 9/108; B62B 9/142; B62B 9/145; B62B 9/147
See application file for complete search history.

(56) References Cited

U.S. PATENT DOCUMENTS

| | | | | |
|---|---|---|---|---|
| 5,417,449 A * | 5/1995 | Shamie | ...... | B62B 7/06 280/47.35 |
| 5,893,577 A * | 4/1999 | Takahashi | ...... | B62B 7/08 280/642 |
| 6,086,087 A * | 7/2000 | Yang | ...... | B62B 7/06 280/47.41 |
| 6,189,914 B1 * | 2/2001 | Worth | ...... | B62B 7/08 280/642 |
| 6,267,406 B1 * | 7/2001 | Huang | ...... | B62B 7/08 280/47.38 |
| 6,802,514 B2 * | 10/2004 | Worth | ...... | B62B 7/08 280/30 |
| 6,843,498 B2 * | 1/2005 | Bretschger | ...... | B62B 7/083 280/47.38 |
| 7,938,433 B2 * | 5/2011 | Pike | ...... | B62B 7/105 280/647 |
| 8,480,115 B2 * | 7/2013 | Chen | ...... | B62B 9/26 280/643 |
| 8,602,441 B2 * | 12/2013 | Li | ...... | B62B 9/28 280/642 |
| 8,733,787 B2 * | 5/2014 | Wang | ...... | B62B 9/203 280/658 |
| 9,283,978 B2 * | 3/2016 | Kikui | ...... | B62B 7/042 |
| 9,452,769 B1 * | 9/2016 | Williams | ...... | A47C 7/748 |
| 9,511,789 B2 * | 12/2016 | Cheng | ...... | B62B 7/008 |
| 9,545,941 B2 * | 1/2017 | Pacella | ...... | B62B 7/142 |
| 9,650,063 B2 * | 5/2017 | Hawk | ...... | B62B 9/26 |
| 10,875,563 B2 * | 12/2020 | Heckler | ...... | B62B 9/12 |
| 2002/0109321 A1 * | 8/2002 | Turner | ...... | B62B 9/26 280/47.38 |

FOREIGN PATENT DOCUMENTS

| | | |
|---|---|---|
| KR | 10-1719132 B1 | 3/2017 |
| KR | 20-0483642 Y1 | 6/2017 |
| KR | 10-2018-0004630 A | 1/2018 |

* cited by examiner

BABY CARRIAGE WITH STORAGE BASKET AND CANOPY

TECHNICAL FIELD

The present invention relates to a baby carriage having improved convenience of use configured to have a structure in which a folding seat is detachably coupled to a rear end of the baby carriage such that the baby carriage is interchangeably used in a single baby carriage mode and a twin baby carriage mode, in which the folding seat coupled to the rear end of the baby carriage is folded so as to be used as a storage space, in which a canopy is detachably coupled to an upper end of a storage basket in order to maximize a storage space and to stably support items received in the storage space, and in which the detachable basket canopy is made of a mesh material so as to be utilized as a means for transporting a pet.

BACKGROUND ART

Baby carriages, which are used as means for transportation and outings at homes having young children, such as babies and infants, have been developed in various forms and have been used.

However, conventional baby carriages are classified into a single baby carriage and a twin baby carriage. In the case in which a first baby is born, therefore, the single baby carriage is used, and, in the case in which a second baby is born, a single baby carriage is further purchased or a twin baby carriage is purchased. As a result, expenses are doubled. In addition, even in the case in which any one of conventional twin baby carriages is purchased, the leftward-rightward width of the baby carriage is large, since most twin baby carriages are configured to each have a left-right symmetrical structure. As a result, there are problems in that it is difficult to turn the baby carriage in a small space and the physical strength of a caregiver is excessively consumed.

As another example, a load storage space in the conventional baby carriage is small. In the case in which there is a large amount of load necessary for outings, therefore, the caregiver must move the baby carrier while carrying a knapsack on their back or holding the load with their hand, which is inconvenient.

As a further example, owning pets has become popular, and therefore the number of homes owing pets has increased. In the case in which homes having babies and infants keep pets, however, people go out while leaving the pets at homes, since they must care for the babies and infants, in many cases.

Consequently, there is a necessity for a baby carriage configured to have a structure in which the baby carriage is generally used as a single baby carriage and the baby carriage is modified into a twin baby carriage when a second baby is born, in which, when there is a large amount of load, a space capable of storing the load is maximally secured, and in which it is possible to carry a pet in the baby carriage irrespective of carrying a baby or an infant in the baby carriage, whereby the baby carriage is used in various forms depending on circumstances of a user or a home.

DISCLOSURE

Technical Problem

Therefore, the present invention has been made in view of the above problems, and it is an object of the present invention to provide a baby carriage having improved convenience of use, the baby carriage being configured to have a structure in which the baby carriage is generally used as a single baby carriage and a seat is detachably coupled to the rear of the single baby carriage such that the single baby carriage is utilized as a twin baby carriage when a second baby is born, in which, when there is a large amount of load for outings, a space capable of storing the load is maximally secured such that the load is stably stored, and in which it is possible to carry a pet in the baby carriage irrespective of carrying a baby or an infant in the baby carriage, whereby the baby carriage is used in various forms depending on circumstances of a user or a home.

Technical Solution

In accordance with the present invention, the above object can be accomplished by the provision of a baby carriage having improved convenience of use, the baby carriage including:

a main frame configured to have a structure in which a side of the main frame is formed in a "∧" shape to completely support a main body of the baby carriage and the main frame can be folded or unfolded at an intersection portion thereof through a hinge structure such that the form of the main frame is variable;

a seat frame, which is a rectangular frame coupled to one side of an inside of the main frame in a leftward-rightward direction, the seat frame being configured to support a baby carriage seat;

a storage basket formed in a shape of a basket having a horizontally flat seat formed at a lower surface thereof, each of a front surface, a rear surface, a left surface, and a right surface of the storage basket being made of a mesh material for ventilation; and a wheel unit including driving wheels coupled to left and right sides of a front and a rear of the main frame in a symmetrical fashion, the wheel unit being configured to drive the baby carriage.

Advantageous Effects

As is apparent from the above description, the present invention has effects in that the baby carriage according to the present invention is generally used as a single baby carriage and a seat is detachably coupled to the rear of the single baby carriage such that the single baby carriage is utilized as a twin baby carriage when a second baby is born, in that, when there is a large amount of load for outings, a space capable of storing the load is maximally secured such that the load is stably stored, and in that it is possible to carry a pet in the baby carriage irrespective of carrying a baby or an infant in the baby carriage, whereby the baby carriage is used in various forms depending on circumstances of a user or a home.

PREFERRED EMBODIMENT OF INVENTION

A baby carriage including:

a main frame (100) configured to have a structure in which a side of the main frame is formed in a "/\" shape to completely support a main body of the baby carriage and the main frame can be folded or unfolded at an intersection portion thereof through a hinge structure such that a form of the main frame is variable;

a seat frame (200), which is a rectangular frame coupled to an inside of the main frame in a leftward-rightward direction, the seat frame being configured to support a baby carriage seat;

a storage basket (300) formed in a basket shape having a horizontally flat seat formed at a lower surface thereof, each of a front surface, a rear surface, a left surface, and a right surface of the storage basket being made of a mesh material for ventilation; and a wheel unit (400) including driving wheels coupled to left and right sides of a front and a rear of the main frame in a symmetrical fashion, the wheel unit being configured to drive the baby carriage.

EMBODIMENTS OF THE INVENTION

Hereinafter, an exemplary embodiment of the present invention will be described with reference to the drawings.

Figure 1:
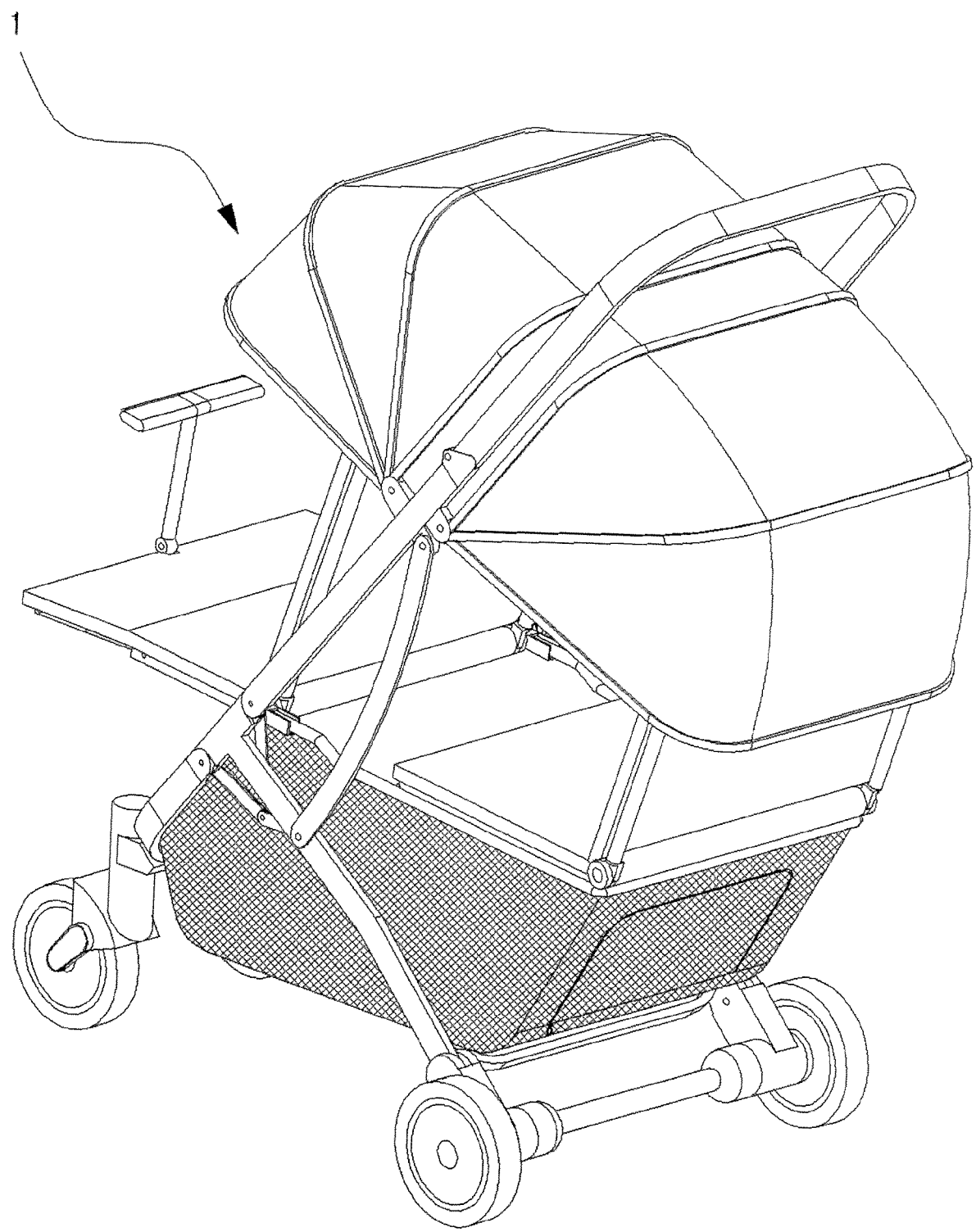
FIG. 1 is a perspective view showing the overall shape of a baby carriage having improved convenience of use according to the present invention.

FIG. 1 is a perspective view showing the overall shape of a baby carriage having improved convenience of use according to the present invention. The baby carriage includes a main frame 100, a seat frame 200, a storage basket 300, and a wheel unit 400.

First, the main frame 100 according to the present invention will be described.

The main frame 100 is configured to have a structure in which the side of the main frame is formed in a "/\" shape to completely support a main body of the baby carriage and the main frame can be folded or unfolded at an intersection portion thereof through a hinge structure such that the form of the main frame is variable.

The main frame includes a first front inclined frame 110, a second front inclined frame 120, a rear inclined frame 130, and an auxiliary link frame 140.

The first front inclined frame 110 is formed so as to constitute the front of a rectangular frame having rounded corners, is inclined forwards, and serves to support a front wheel driving unit and an upper end of the front of the storage basket.

Figure 2:
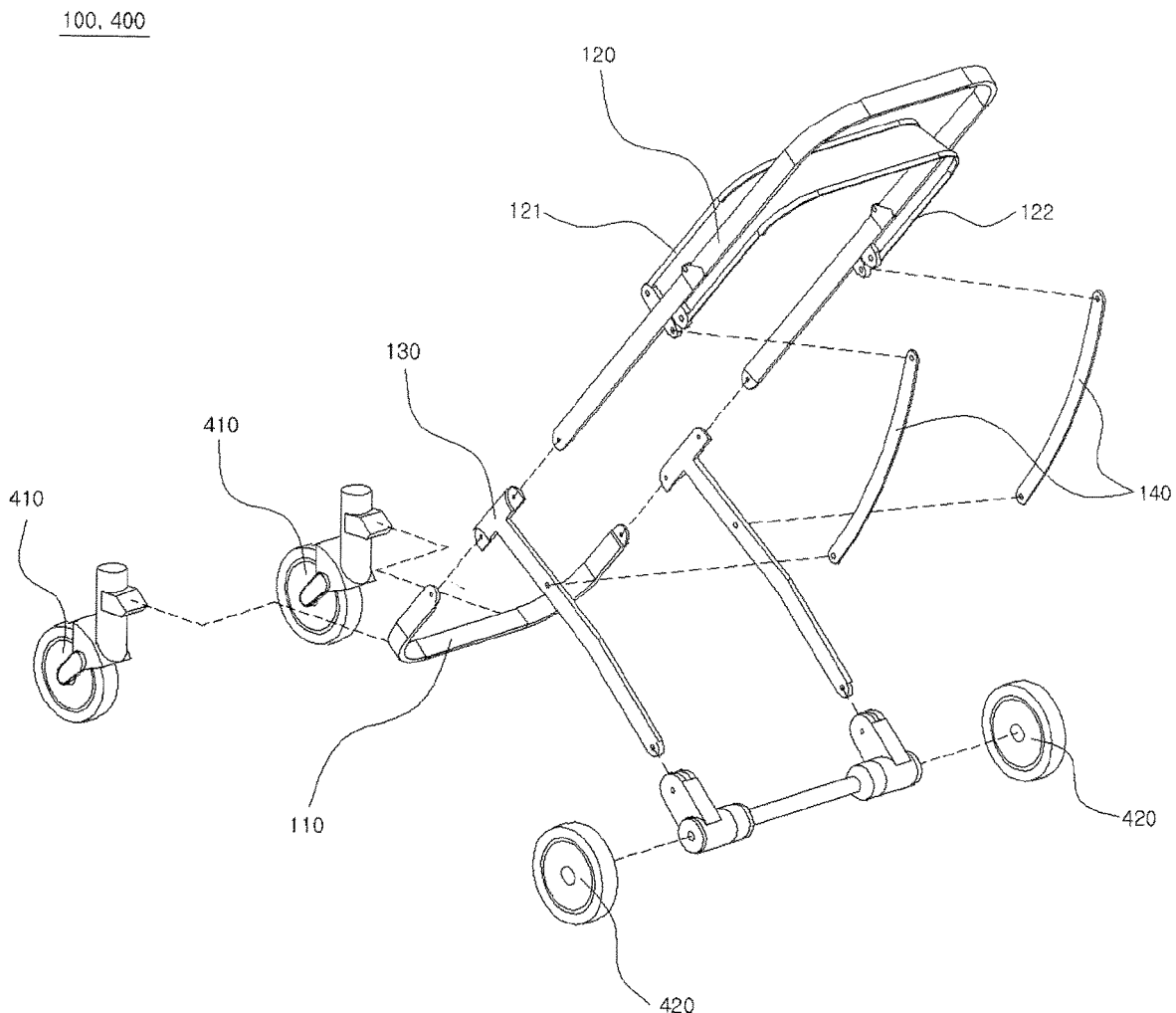
FIG. 2 is an exploded perspective view showing elements of a main frame and a wheel unit of the baby carriage having improved convenience of use according to the present invention.
Figure 3:
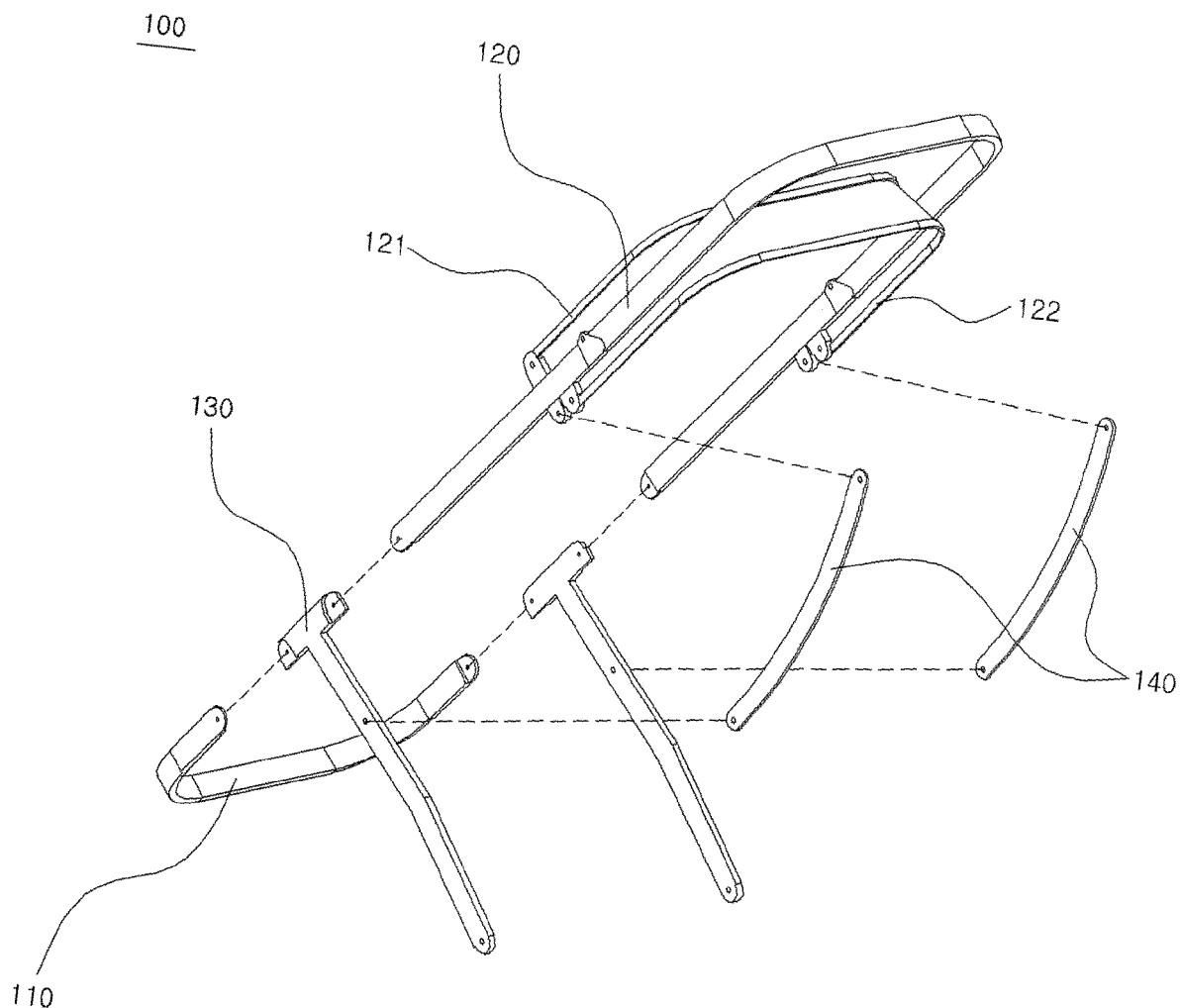
FIG. 3 is a perspective view showing the elements of the main frame according to the present invention.

As shown in FIG. 2, the first front inclined frame 110 according to the present invention is axially coupled to a T-shaped front rotary shaft of the rear inclined frame so as to be rotated parallel to the rear inclined frame in a folding mode.

The second front inclined frame 120 is formed so as to constitute the rear of the rectangular frame having rounded corners, is inclined forwards, and serves as a handle of the baby carriage in the form of a grip. A baby carriage locking button is formed at a middle of the rear of the second front inclined frame.

When the baby carriage locking button is pushed, a rotary shaft locking device is unlocked, whereby the baby carriage is in the folding mode, and therefore the volume of the baby carriage is reduced.

The second front inclined frame includes a front canopy 121 and a rear canopy 122.

The front canopy 121 is hingedly coupled to one side of an upper end of the second front inclined frame in a leftward-rightward direction, can be unfolded about a rotary shaft in the forward direction in the form of a fan, and is installed so as to be located at an upper end of the front of the seat frame.

In the case in which the front canopy is maximally unfolded about the rotary shaft in the forward and downward directions, the upper end of a first seat unit is covered. In the case in which the front canopy is maximally folded about the rotary shaft in the rearward and upward directions, the fan-shaped frame is laid in folds, whereby it is possible to minimize volume.

As a result, the upper end of the first seat unit can be closed to prevent a baby from being exposed to ultraviolet light, rain, and wind.

The rear canopy 122 is hingedly coupled to one side of the lower end of the second front inclined frame in the leftward-rightward direction, can be unfolded about a rotary shaft in the rearward direction in the form of a fan, and is installed so as to be located at the upper end of the rear of the seat frame.

In the case in which the rear canopy is maximally unfolded about the rotary shaft in the rearward and downward directions, the upper end of a second seat unit is covered. In the case in which the rear canopy is maximally folded about the rotary shaft in the forward and upward directions, the fan-shaped frame is laid in folds, whereby it is possible to minimize volume.

As a result, the upper end of the second seat unit is closed to prevent a baby from being exposed to ultraviolet rays, rain, and wind.

As shown in FIG. 2, the second front inclined frame 120 according to the present invention is axially coupled to a T-shaped rear rotary shaft of the rear inclined frame so as to be rotated parallel to the rear inclined frame in the folding mode.

The rear inclined frame 130 is a T-shaped frame having rotary shafts formed at the front and rear sides of the front thereof. The rear inclined frame is formed in left-right symmetry so as to constitute one side of the middle of the rectangular frame, hingedly couples the left and right sides of the first front inclined frame and the second front inclined frame to each other, and is inclined rearwards. The end of the rear of the rear inclined frame is coupled to a rear wheel unit in order to support the rear wheel unit.

As shown in FIG. 2, the rear inclined frame 130 according to the present invention is coupled to the rear rotary shaft of the first front inclined frame and to the front rotary shaft of the second front inclined frame, and is provided with steps, by each of which a corresponding one of the rotary shafts is prevented from being rotated in the reverse direction.

The auxiliary link frame 140 is hingedly coupled to one side of the second front inclined frame 120 and to one side of the rear inclined frame 130 in left-right symmetry so as to be supported thereby.

The auxiliary link frame is coupled to the second front inclined frame 120 and to the rear inclined frame 130 therebetween to stably support a driving mode and the folding mode of the baby carriage.

Next, the seat frame 200 according to the present invention will be described.

The seat frame 200 is a rectangular frame coupled to an inside of the main frame in the leftward-rightward direction, and serves to support a baby carriage seat.

The seat frame includes a seat support frame 210, a first seat unit 220, and a second seat unit 230.

The seat support frame 210 is formed in a rectangular frame shape, and is coupled to an inside of the second front inclined frame in the leftward-rightward direction so as to be parallel to the ground surface.

Specifically, the seat support frame 210 according to the present invention includes a seat main frame 211, a front seat frame 212, and a rear seat frame 213.

Figure 4:
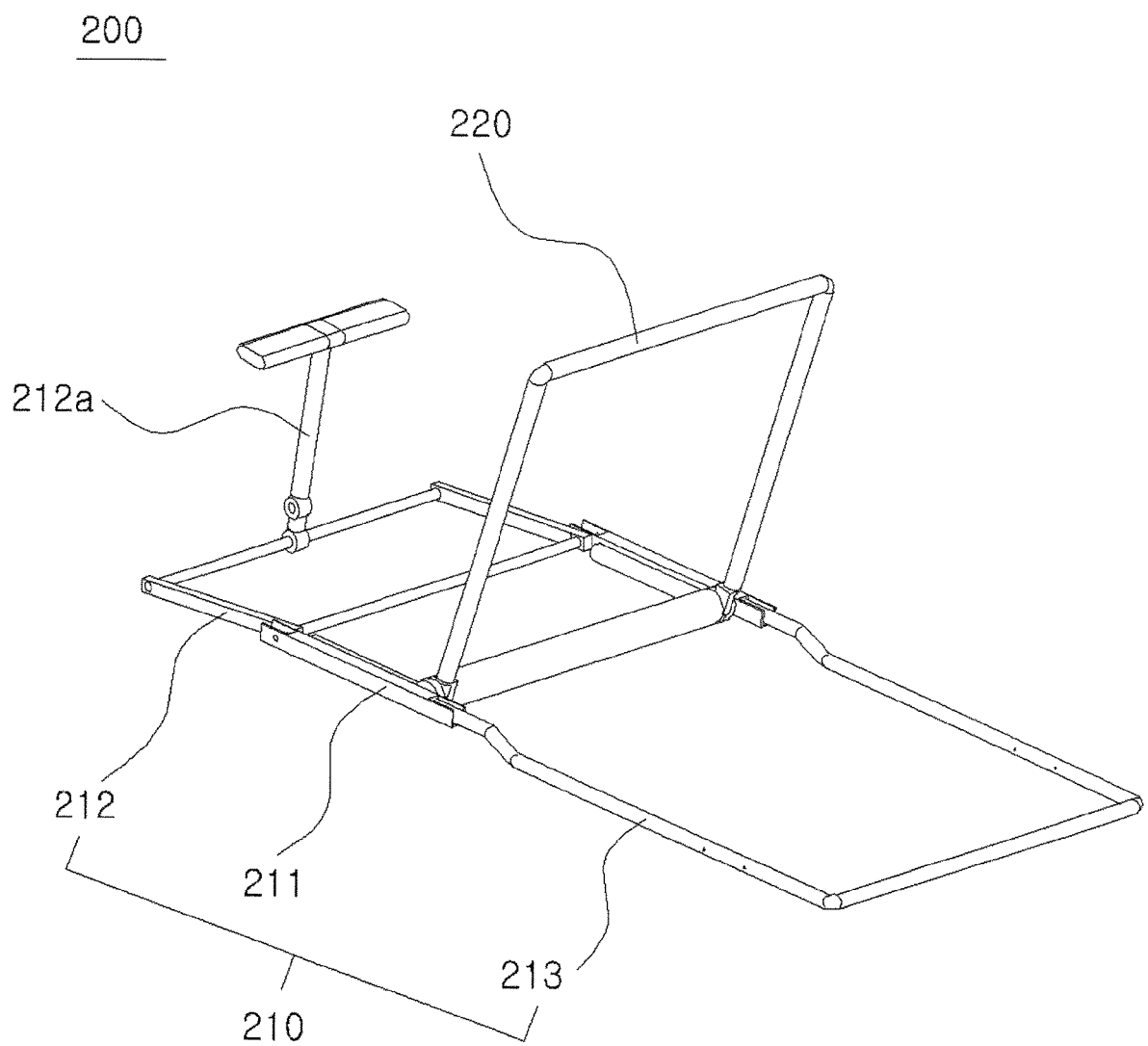
FIG. 4 is a perspective view showing elements of a seat frame according to the present invention.
Figure 5:
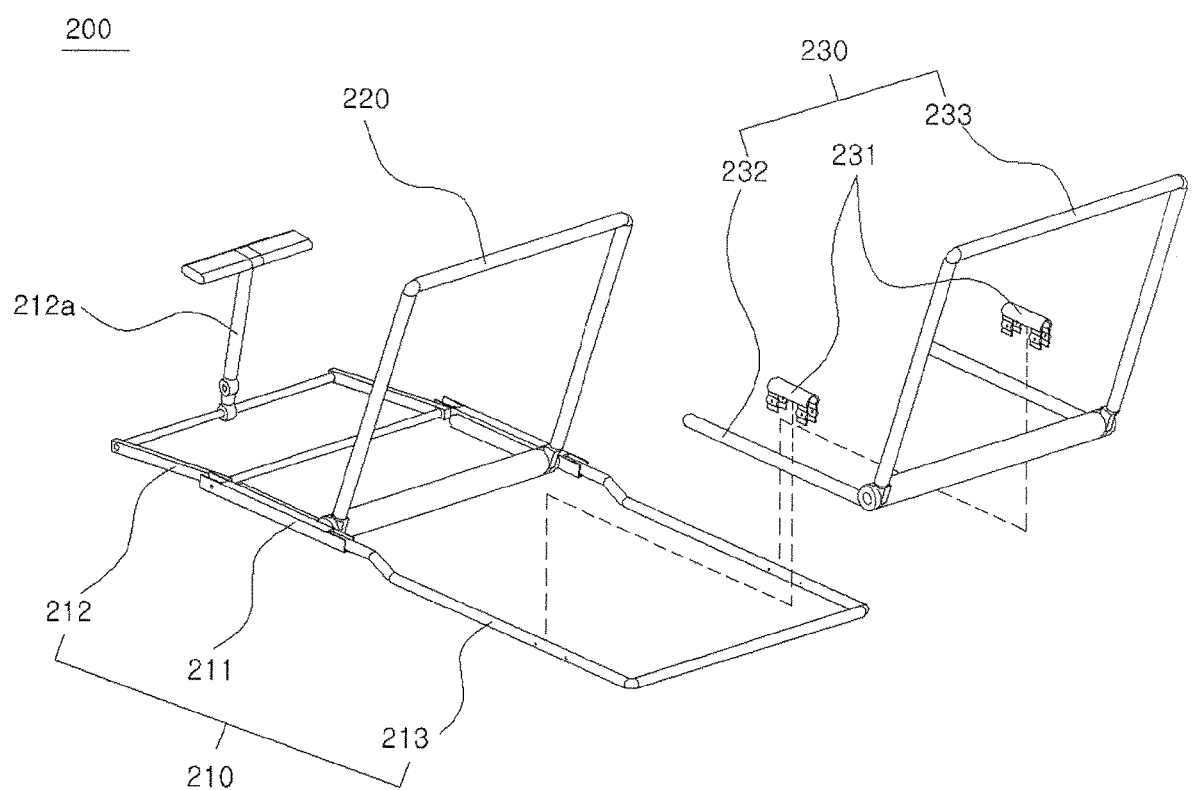
FIG. 5 is a perspective view showing the state in which a second seat unit is coupled to the upper end of a rear seat frame according to the present invention.

As shown in FIG. 4, the seat main frame 211 is a rectangular frame that is coupled to the inside of the second front inclined frame 120 in the leftward-rightward direction so as to be parallel to the ground surface, and serves to completely support the seat frame.

The front seat frame 212 is a rectangular frame that is hingedly coupled to the inside of the front of the seat main frame in the leftward-rightward direction. A safety bar 212a, which can be inserted between the legs of a baby, is coupled to the middle of the front of the front seat frame. The front seat frame serves to support the first seat unit 220 coupled to the upper end thereof.

A safety push bar 212b is formed at each of the left and right sides of the lower end of the front of the front seat frame 212 according to the present invention in order to rotate the front seat frame about a rear rotary shaft coupled to the seat main frame in the downward direction and to fix the front seat frame.

Figure 10:
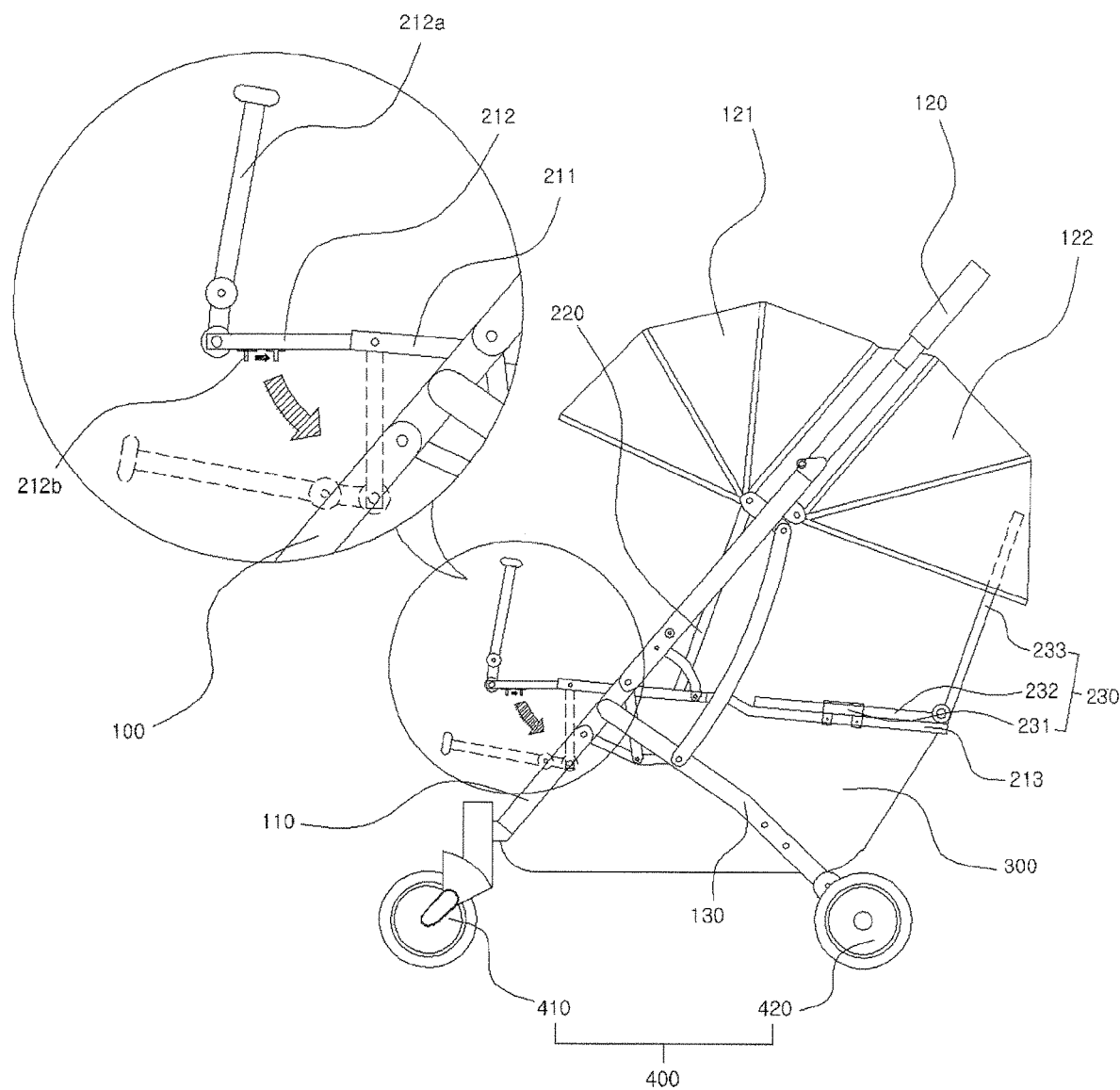
FIG. 10 is a view showing the twin baby carriage mode in which the second seat unit is coupled to the baby carriage according to the present invention when viewed in the lateral direction with an enlarged view showing an embodiment in which a safety push bar is pushed rearwards to rotate a front seat frame downwards.
Figure 11:
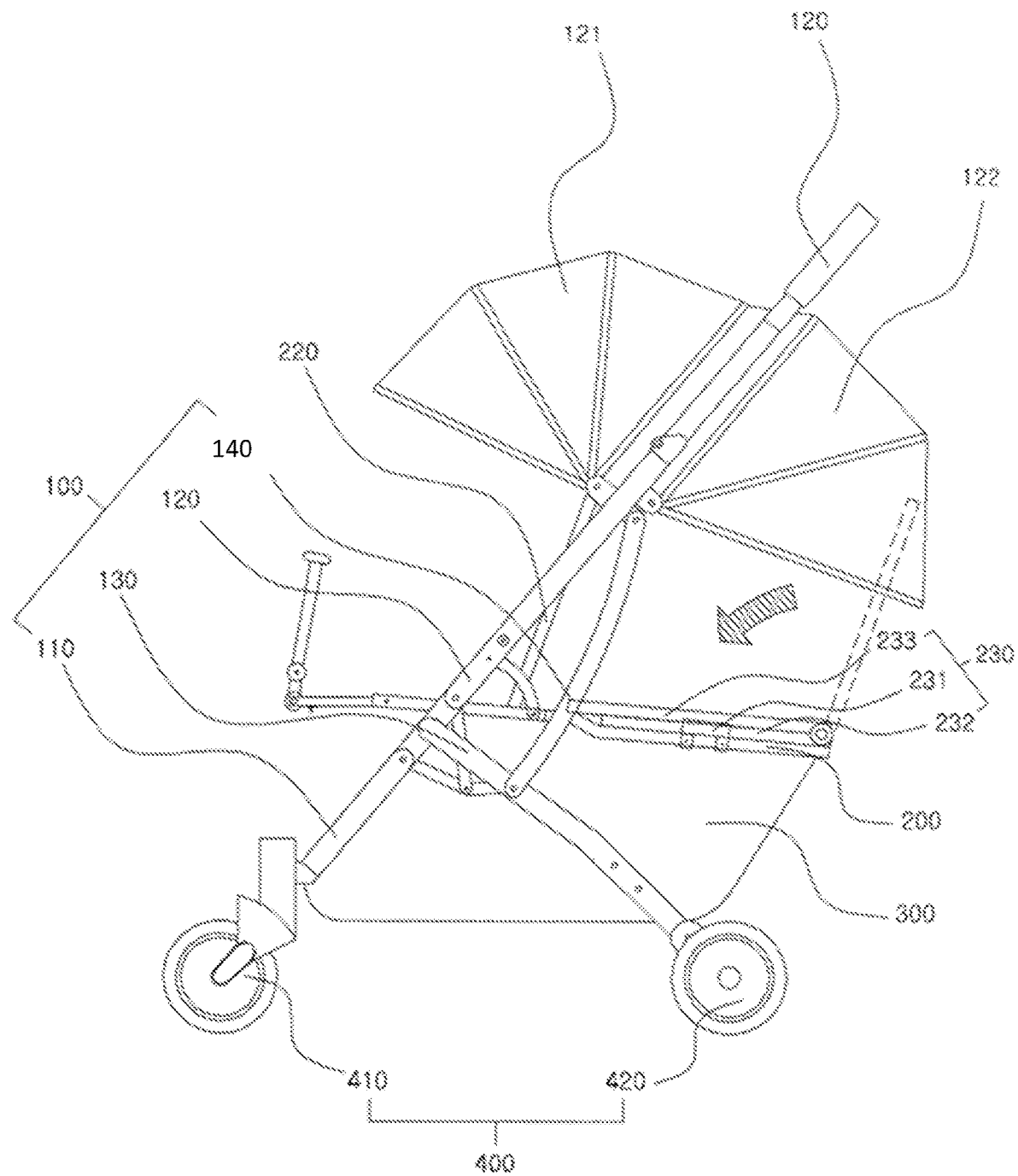
FIG. 11 is a side view showing a shopping basket storage mode in which a back frame of the second seat unit is rotated and laid so as to be in tight contact with a seat frame when viewed in the lateral direction in the twin baby carriage mode in which the second seat unit is coupled to the rear seat frame of the baby carriage according to the present invention.
Figure 12:
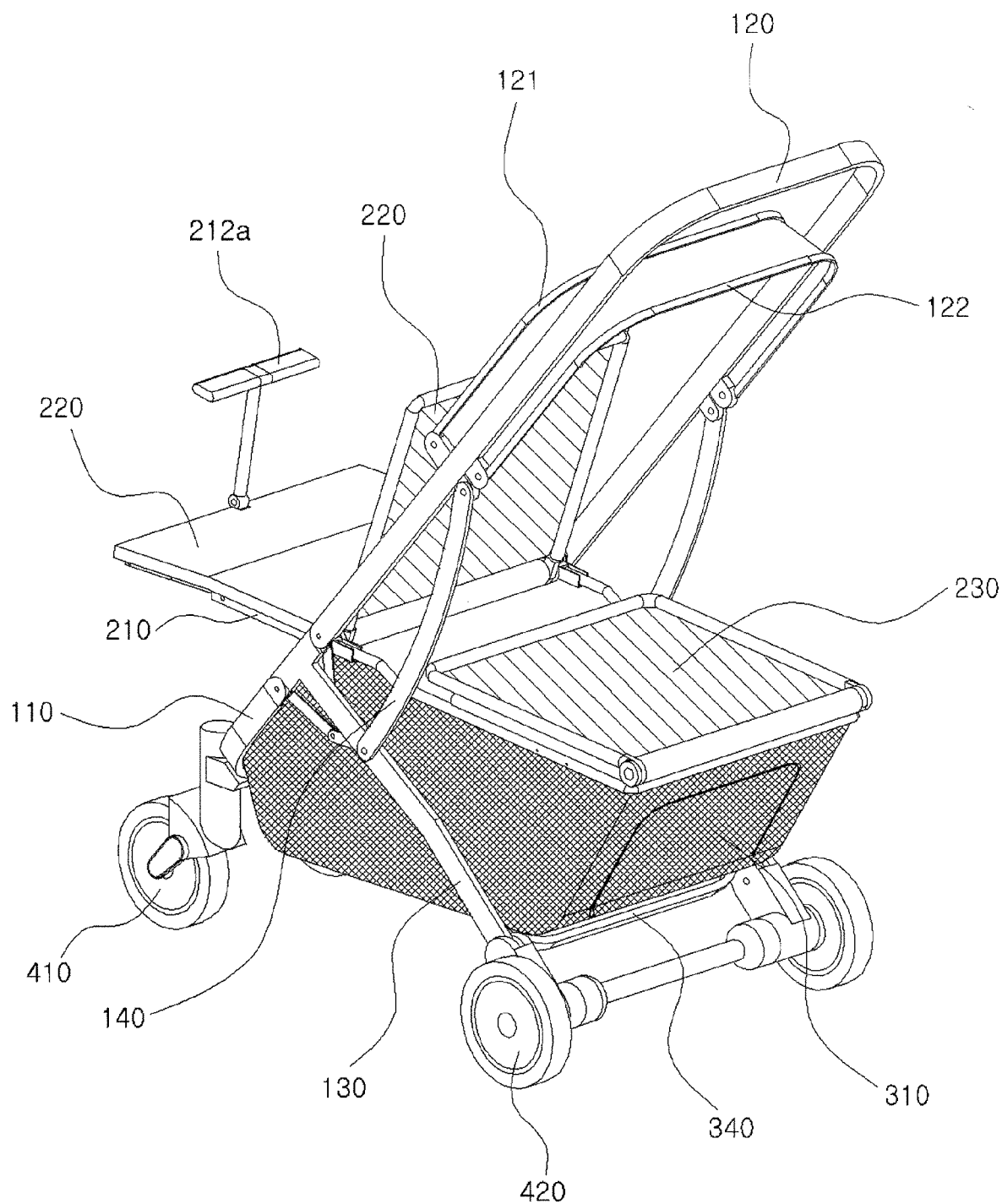
FIG. 12 is a side view showing the shopping basket storage mode in which the back frame of the second seat unit is rotated and laid so as to be in tight contact with the seat frame when viewed in the lateral direction in the twin baby carriage mode in which the second seat unit is coupled to the rear seat frame of the baby carriage according to the present invention.
Figure 13:
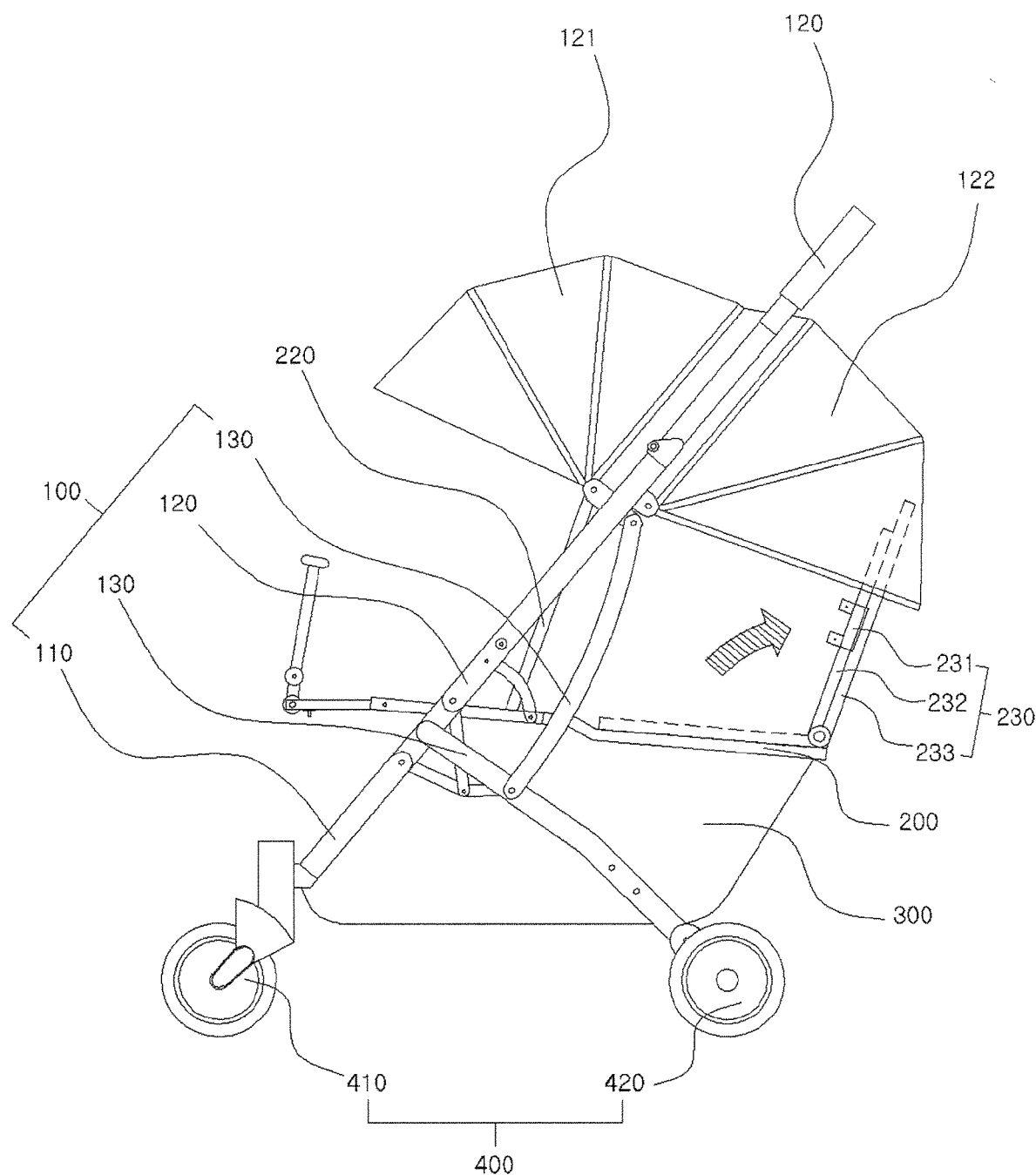
FIG. 13 is a side view showing a shopping basket mode in which the seat frame of the second seat unit is rotated and erected so as to be in tight contact with the back frame when viewed in the lateral direction in the twin baby carriage mode in which the second seat unit is coupled to the rear seat frame of the baby carriage according to the present invention.
Figure 14:
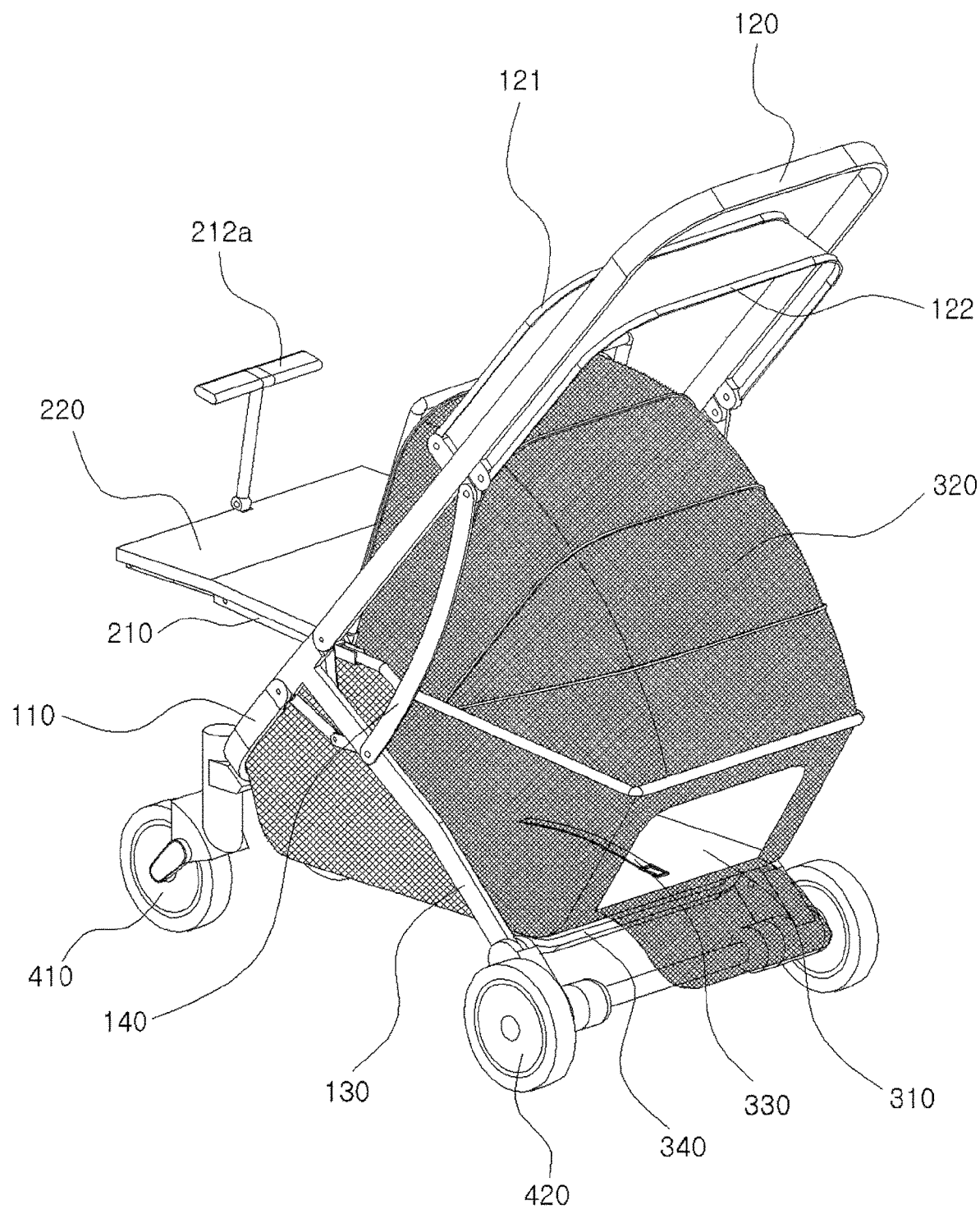
FIG. 14 is a perspective view showing a pet dog carriage mode in which the basket canopy is coupled to the rear seat frame of the baby carriage according to the present invention.
Figure 15:
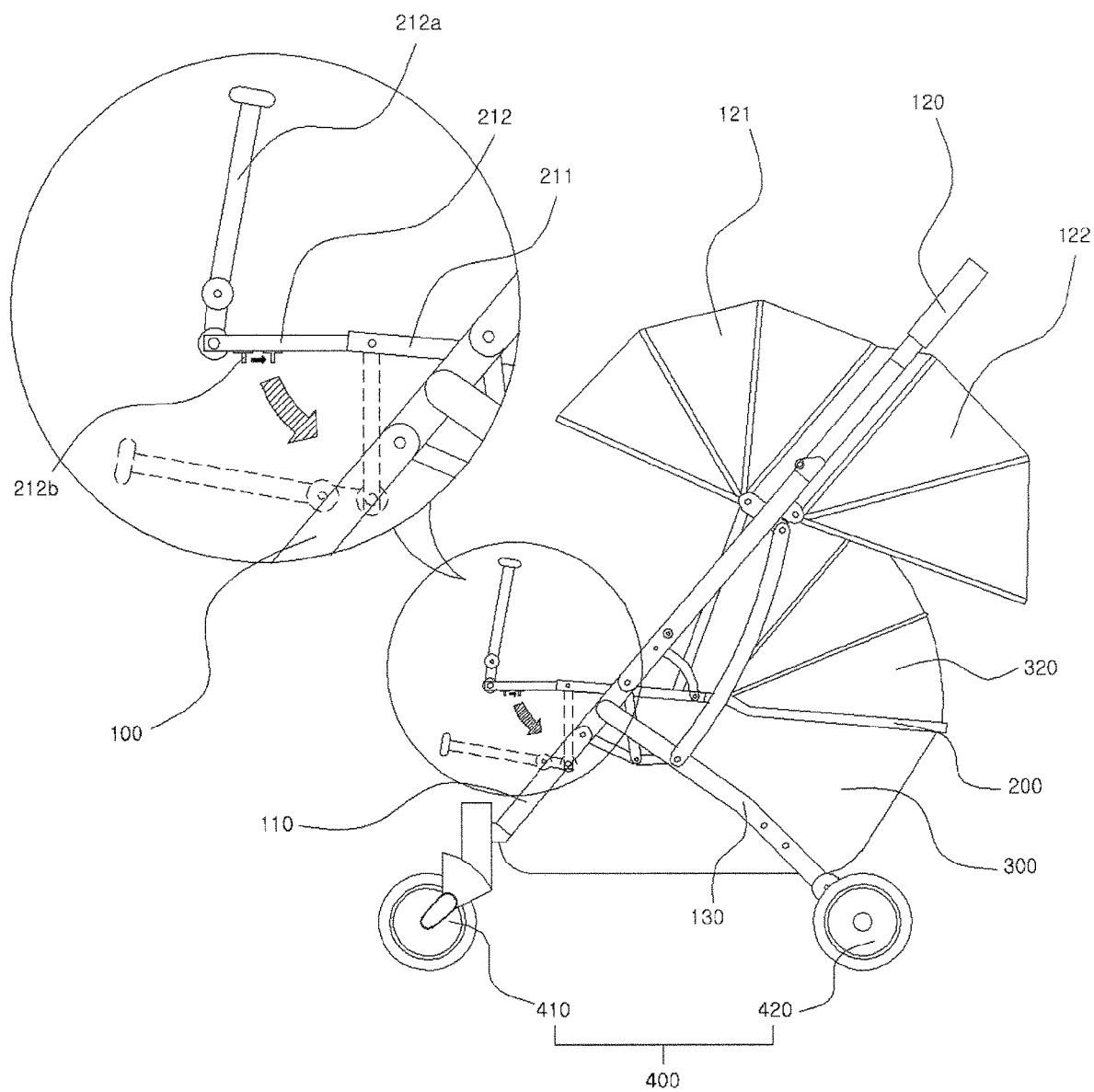
FIG. 15 is a perspective view showing the pet dog carriage mode in which the basket canopy is coupled to the rear seat frame of the baby carriage according to the present invention when viewed in the lateral direction with an enlarged view showing an embodiment in which the safety push bar is pushed rearwards to rotate the front seat frame downwards.

When the safety push bars 212b formed at the left and right sides in a symmetrical fashion are pushed rearwards, as shown in FIGS. 10 and 15, the front seat frame is unlocked, whereby the front seat frame is rotated in the downward direction such that a baby can be seated on the first seat unit as if the baby were seated on a chair. At this time, the safety bar 212a may be oriented in the forward direction so as to be used as a footrest.

When the front seat frame is rotated in the horizontal direction, the safety push bars 212b formed at the left and right sides in a symmetrical fashion return to the original positions thereof due to springs mounted therein, whereby the front seat frame is fixed such that a baby can be seated on the first seat unit as if the baby were seated on the floor. Since the safety bar 212a is formed at the middle of the front of the front seat frame, the state in which the baby is stably seated is maintained.

Figure 16:
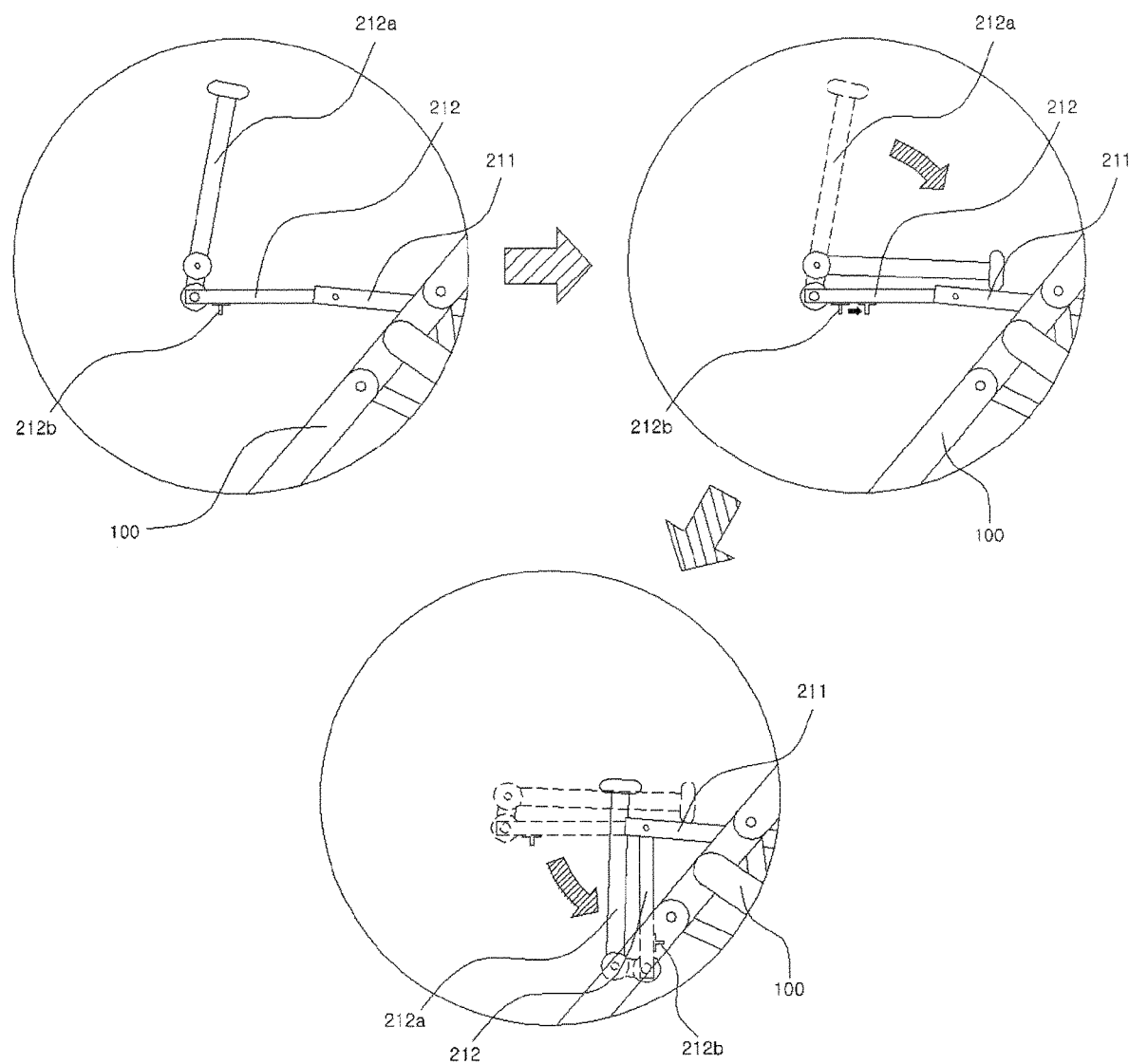
FIG. 16 is an enlarged side view showing the state in which the safety push bar coupled to the front of the front seat frame according to the present invention is laid rearwards and the front seat frame axially coupled to one side of the front of a seat main frame is rotated downwards to minimize volume.

In addition, as shown in FIG. 16, the safety bar 212a of the front seat frame 212 may be axially rotated and then laid. Subsequently, the safety push bars 212b formed in left-right symmetry may be pushed rearwards such that the front seat frame is unlocked, and the front seat frame may be rotated about the rotary shaft axially coupled to one side of the front of the seat main frame in the downward direction, whereby the volume of the seat frame may be reduced.

The rear seat frame 213 is a rectangular frame that is hingedly coupled to the inside of the rear of the seat main frame in the leftward-rightward direction, and serves to support the second seat unit coupled to the upper end thereof.

In the case in which the baby carriage is used as a twin baby carriage depending on the purpose of use of the baby carriage, the second seat unit 230 is coupled to the upper end of the rear seat frame 213 according to the present invention via a second seat coupling unit 231. In the case in which the baby carriage is used as a single baby carriage depending on the purpose of use of the baby carriage, a basket canopy 320 is coupled to the inside of the rear seat frame 213 according to the present invention.

Figure 6:
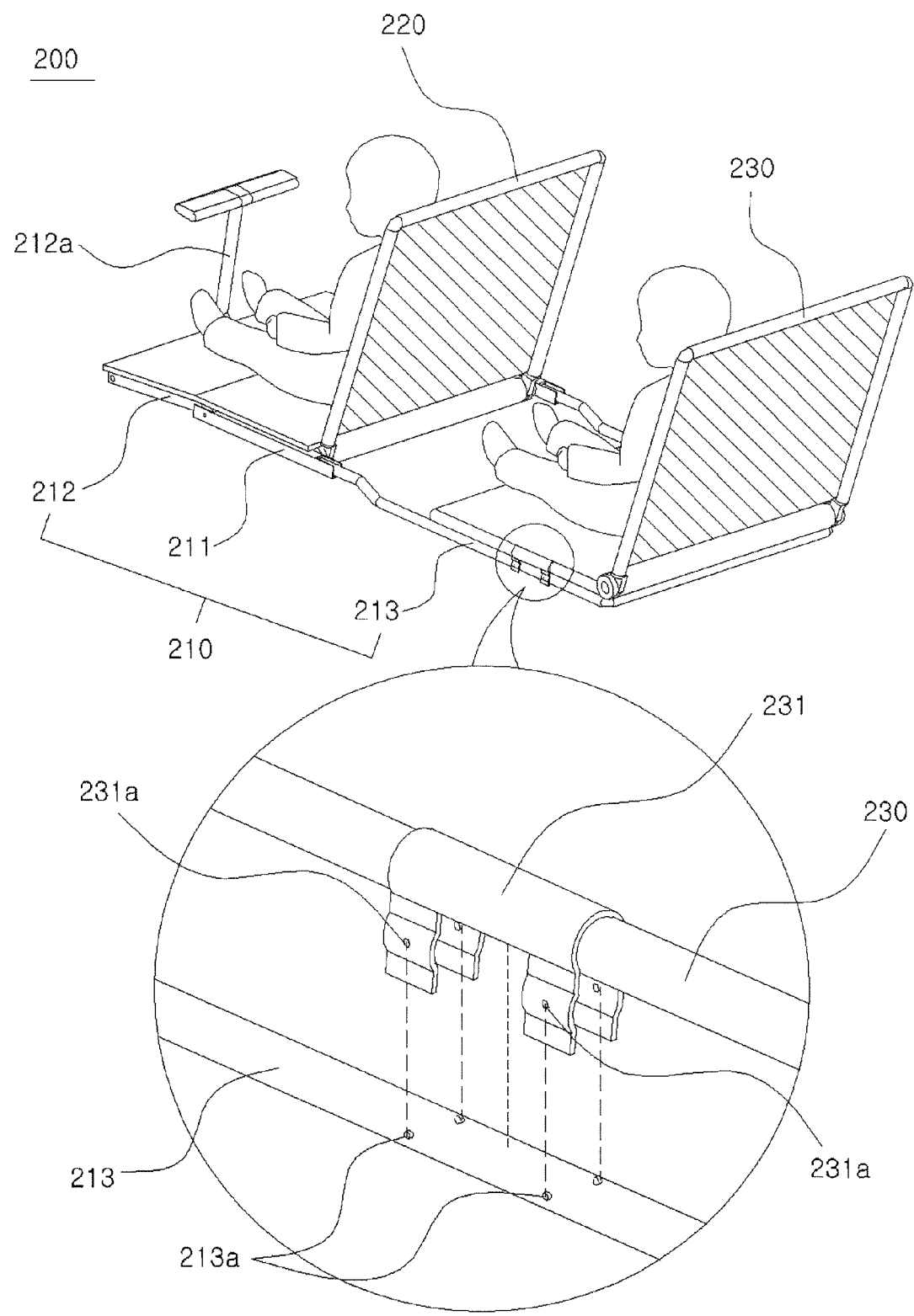
FIG. 6 is a perspective view showing an embodiment in which babies are seated on a first seat unit and a second seat unit according to the present invention with an enlarged perspective view showing a coupling portion of the second seat unit coupled to the upper end of the rear seat frame.
Figure 7:
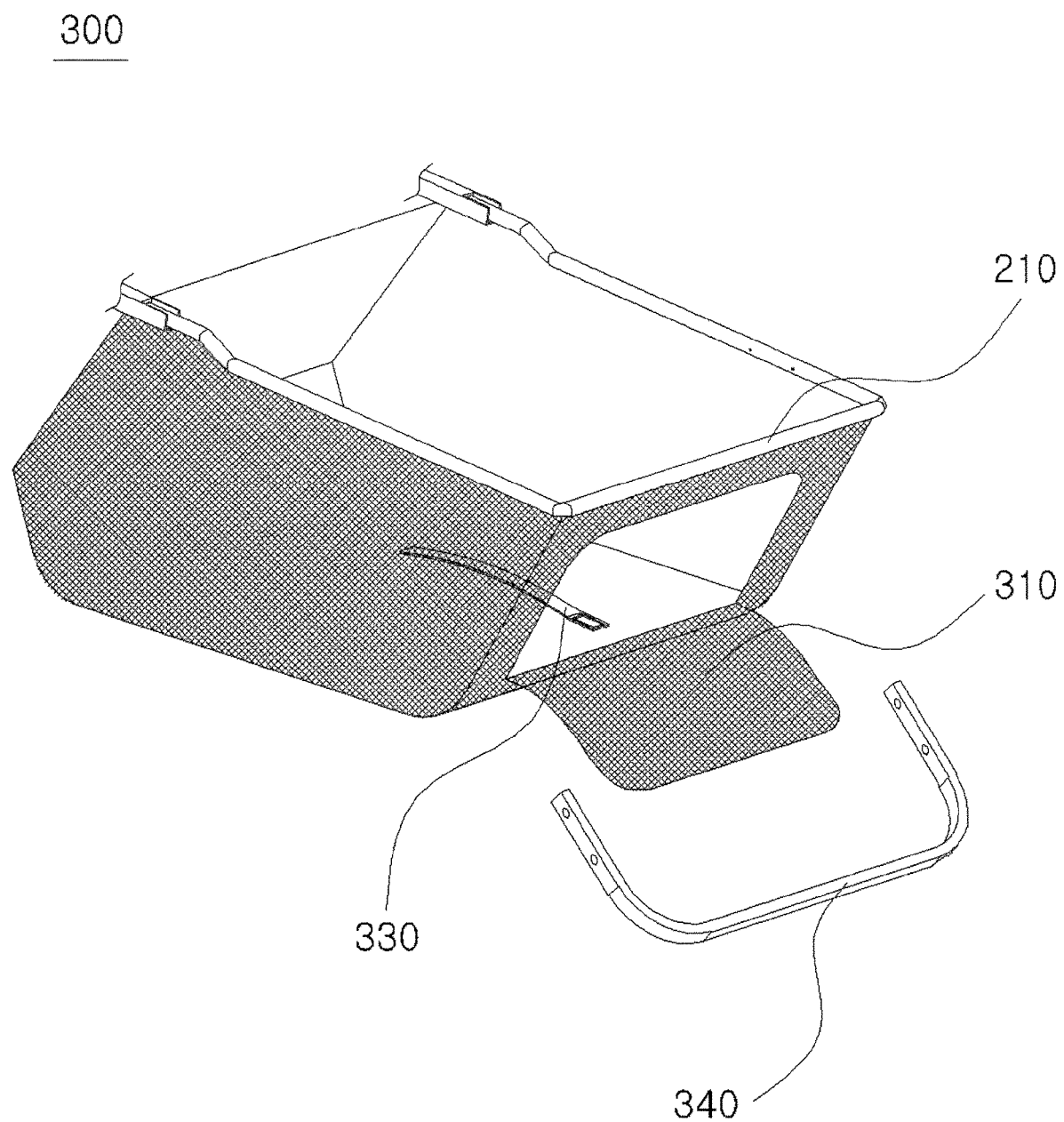
FIG. 7 is a perspective view showing elements of a storage basket, to which a basket canopy according to the present invention is not installed.
Figure 8:
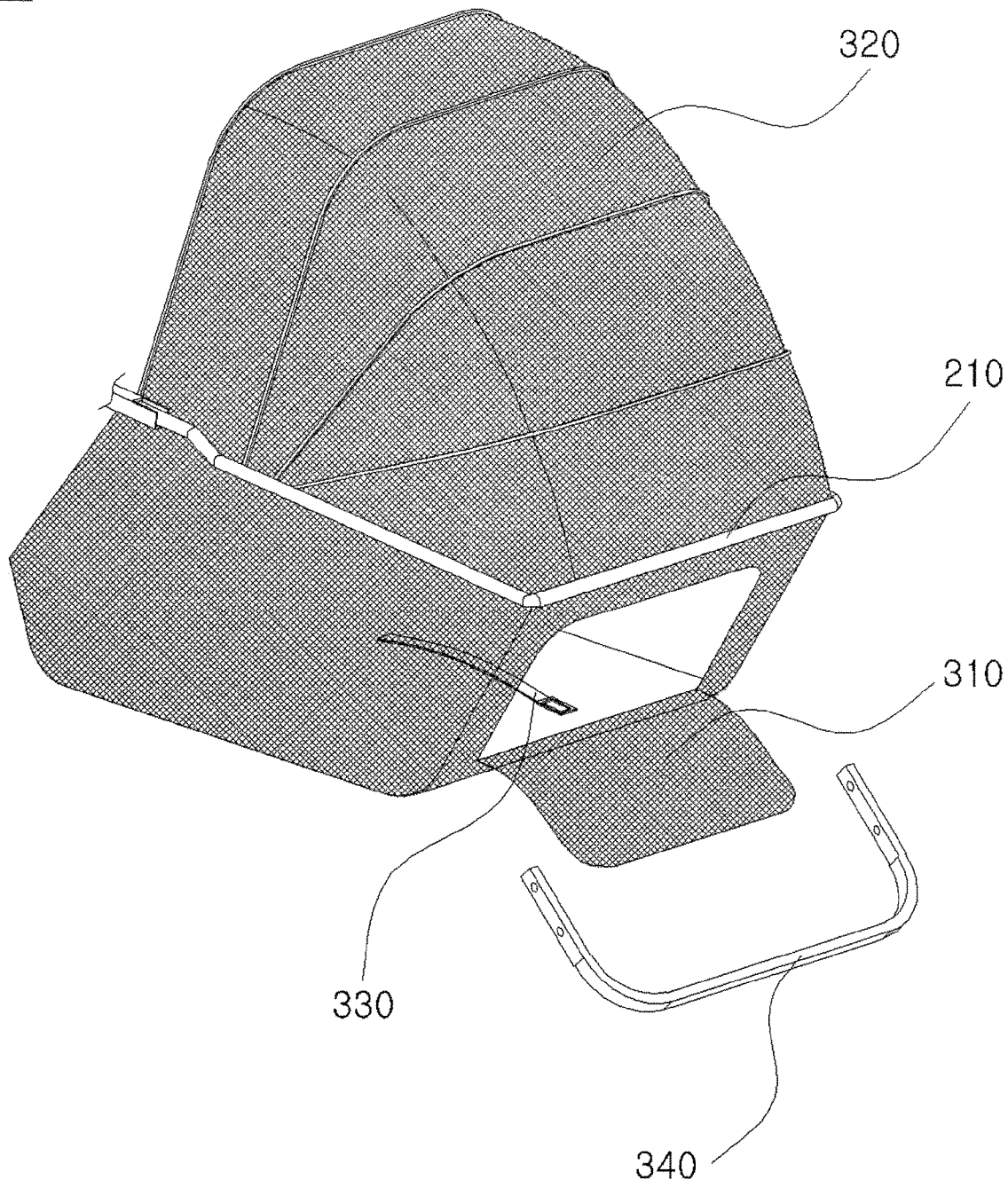
FIG. 8 is a perspective view showing the elements of the storage basket according to the present invention.
Figure 9:
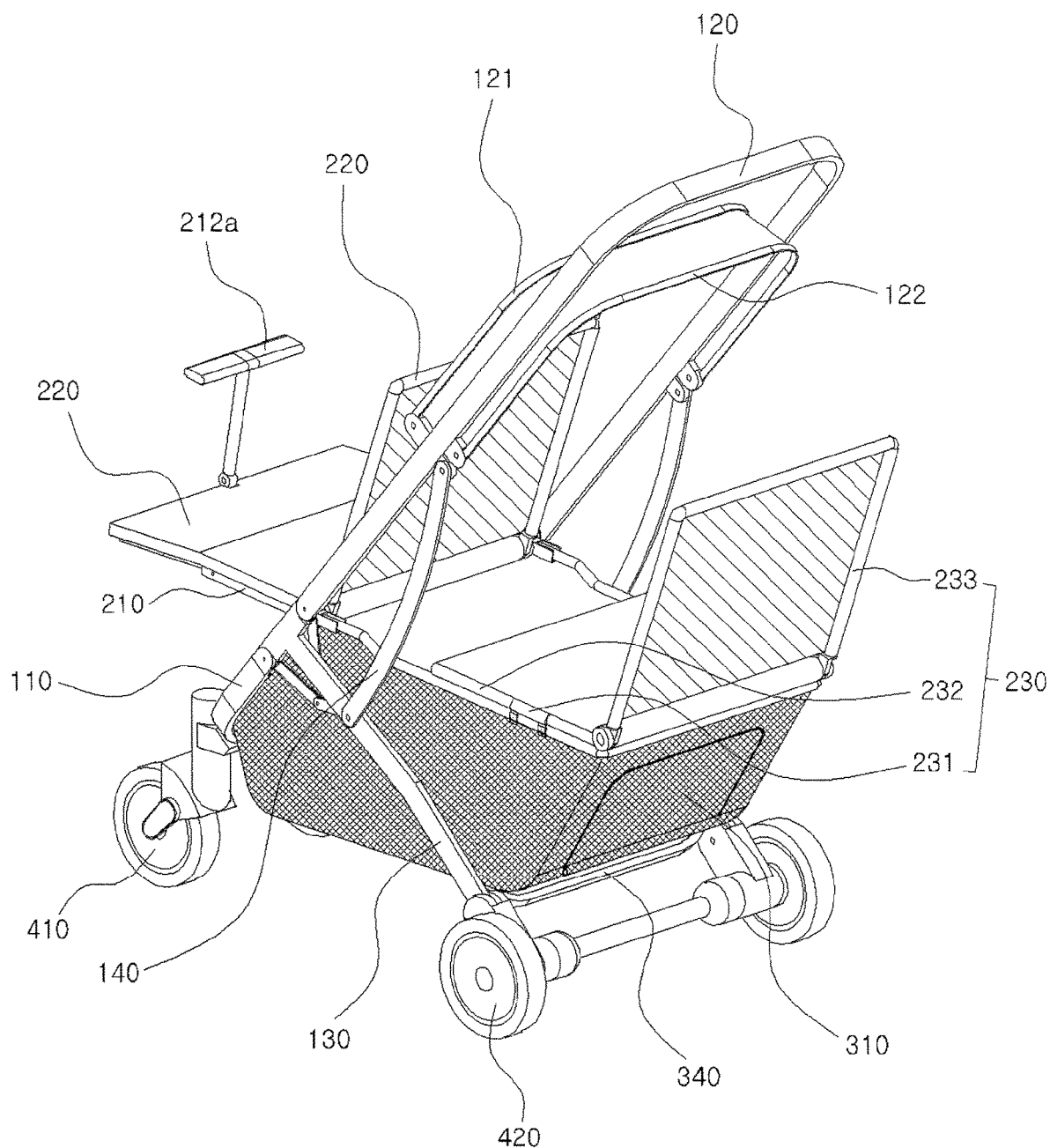
FIG. 9 is a perspective view completely showing a twin baby carriage mode in which the second seat unit is coupled to the baby carriage according to the present invention.

As shown in FIG. 6, the second seat coupling unit 231 is provided at the front and rear sides thereof with fitting portions formed so as to be concave in the downward direction, and a seat coupling recess 231a is formed in the middle of each of the fitting portions. A seat coupling protrusion 213a protruding from each of the left and right sides of the rear seat frame is inserted into a corresponding one of the seat coupling recesses 231a, whereby coupling between the second seat coupling unit and the rear seat frame is achieved.

In addition, each of the seat coupling protrusions 213a is configured to be inserted into a corresponding one of the seat coupling recesses 231a of the second seat coupling unit to prevent the second seat coupling unit from sliding in the forward-rearward direction and to fix the second seat unit such that the second seat unit is stably fastened.

The first seat unit 220 is a chair-shaped frame coupled to one side of the front of the upper end of the seat support frame, and includes a seat frame coupled to the front of the seat support frame so as to be parallel thereto and a back frame formed at the upper end of the rear of the seat frame, the angle of the back frame being adjusted through a hinge structure.

Here, the back frame may be rotated about rotary shafts provided at the left and right sides of the lower end thereof and then fixed, whereby the angle of the back frame may be adjusted.

The second seat unit 230 is a chair-shaped frame detachably coupled to one side of the rear of the upper end of the seat support frame, and includes a seat frame 232 coupled to the rear of the seat support frame so as to be parallel thereto, a back frame 233 formed at the upper end of the rear of the seat frame, the angle of the back frame being adjusted through a hinge structure, and a second seat coupling unit 231 fitted on each of the left and right sides of the seat frame in a symmetrical fashion, the second seat coupling unit having a fitting portion formed so as to be concave in the downward direction.

As shown in FIG. 6, the second seat coupling unit 231 is provided at the front and rear sides thereof with fitting portions formed so as to be concave in the downward direction, and the seat coupling recess 231a is formed in the middle of each of the fitting portions.

At this time, the seat coupling protrusion 213a protruding from each of the left and right sides of the rear seat frame is inserted into a corresponding one of the seat coupling recesses 231a, whereby coupling between the second seat coupling unit and the rear seat frame is achieved.

As a result, the second seat unit 230 is stably coupled to the upper end of the rear seat frame 213, and the concave fitting portions serve to support the rear seat frame such that the rear seat frame cannot be moved in the forward-rearward direction.

Here, the back frame 233 may be rotated about rotary shafts provided at the left and right sides of the lower end thereof and then fixed, whereby the angle of the back frame may be adjusted.

In the case in which the second seat unit 230 is coupled to the baby carriage 1 having improved convenience of use according to the present invention, switching it to a twin baby carriage mode is possible. In the case in which there is a second baby, therefore, it is not necessary to further purchase a single baby carriage or a twin baby carriage, whereby it is possible to reduce financial burden of a caregiver.

In the case in which the second seat unit 230 is separated from the baby carriage 1 having improved convenience of use according to the present invention, switching it to a single baby carriage mode is performed. In this case, a basket canopy 320 may be coupled to the inside of the rear seat frame 213 in the form of a zipper, whereby it is possible to maximally provide a load storage space. In addition, even when a large amount of load is stored, the load is prevented from falling out of the basket canopy, whereby it is possible to stably store the load. In the case in which no load is stored, a pet may be carried in the basket canopy.

Next, the storage basket 300 according to the present invention will be described.

The storage basket 300 is formed in the shape of a basket having a horizontally flat seat formed at the lower surface thereof. Each of the front surface, the rear surface, the left surface, and the right surface of the storage basket is made of a mesh material for ventilation. The storage basket includes a pet gate 310, a basket canopy 320, a safety string 330, and a basket support frame 340.

The pet gate 310 is disposed at the middle of the rear of the storage basket, can be opened or closed in the form of a zipper, and serves as a gate for pets.

In the case in which a pet is carried in the storage basket, the pet gate serves as a gate for the pet. In the case in which a load is stored in the storage basket, the pet gate serves as a passage through which the load is introduced into the storage basket and withdrawn from the storage basket.

The basket canopy 320 is coupled to the lower end of the inside of the rear of the seat frame in the form of a zipper, and can include a plurality of overlapping frames. The plurality of overlapping frames can be unfolded in the form of a fan in the upward direction, and is coupled to hooks formed at the left and right sides and the middle of the upper end of the rear of the back of the first seat unit.

The basket canopy 320 according to the present invention is made of a mesh material for ventilation such that a pet can smoothly breathe and see outside well when carried in the storage basket.

The basket canopy blocks an opening defined in the upper end of the storage basket. In the case in which a pet is carried in the storage basket, therefore, the basket canopy prevents the pet from escaping from the storage basket. In the case in which a large amount of load is stored in the storage basket, the basket canopy prevents the upper portion of the load from falling out from the storage basket.

The safety string 330 is an elastic band having one side coupled to the middle of the inside of the lower surface of the storage basket, and has a safety loop formed at the end thereof.

In the case in which a pet is carried in the storage basket, an animal collar can be connected to the safety loop of the safety string in order to prevent a danger that may occur as the pet abruptly rushes out of the storage basket when the pet gate 310 is opened or when the basket canopy 320 is folded.

Also, in the case in which a load is stored in the storage basket, the safety loop can be connected to the inside of the seat frame after the load is fixed so as not to shake in order to minimize external impact on the load and to prevent the load from being biased to one side.

The basket support frame 340 is coupled to the left and right sides of the lower end of the inside of the rear inclined frame to support the lower surface of the rear of the storage basket.

The basket support frame is installed at the lower end of the inside of the rear inclined frame so as to be in maximally tight contact therewith. The basket support frame increases the inner height of the storage basket, and stably supports the lower end of the storage basket.

Next, the wheel unit 400 according to the present invention will be described.

The wheel unit 400 includes driving wheels coupled to the left and right sides of the front and the rear of the main frame in a symmetrical fashion in order to drive the baby carriage.

The wheel unit 400 includes a front wheel driving unit 410 and a rear wheel driving unit 420.

The front wheel driving unit 410 is coupled to the left and right sides of the lower end of the front of the first front inclined frame in a symmetrical fashion. A front wheel detachment switch, which is formed in the shape of a sliding bar and is configured to be movable in the upward-downward direction, is positioned at the upper end of the rear of the front wheel driving unit. The front wheel driving unit supports the lower end of the front of the baby carriage. Front wheels can be rotated or stopped in order to move the baby carriage.

In the case in which the front wheel detachment switch is pushed in the downward direction, the front wheels, which are coupled to the front wheel driving unit via pins, may be separated from the front wheel driving unit. The front wheel detachment switch can return to the original position thereof due to a spring mounted therein. When the pins of the detached front wheels are inserted into front wheel pin recesses, the front wheels may be coupled to the front wheel driving unit.

As described above, the front wheels are configured to be attached or detached, whereby it is possible to easily carry and store the front wheels.

The rear wheel driving unit 420 is coupled to the left and right sides of the rear of the rear inclined frame in the form of a rotary shaft. The rotary shaft is formed in the center of the inside of the rear wheel driving unit, and rear wheels are coupled to the left and right ends of the rotary shaft. A brake is positioned at the upper end of the right side of the rotary shaft. The rear wheel driving unit supports the lower end of the rear of the baby carriage. The rear wheels can be rotated or stopped in order to move the baby carriage.

Hereinafter, the operation of the baby carriage having improved convenience of use according to the present invention will be described in detail.

First, when the baby carriage locking button, which is positioned at the middle of the inside of the handle of the rear inclined frame, is pushed, the main frame is unfolded and fixed.

At this time, the first seat unit can be automatically unfolded.

Next, in the case in which two babies are carried depending on the circumstances of a user, the second seat unit is coupled to the upper end of the rear seat frame.

At this time, seat coupling protrusions of the rear seat frame are inserted into seat coupling recesses of the second seat coupling unit in order to securely fasten the second seat unit.

Here, in the case in which one baby is carried and a large amount of load is stored depending on the circumstances of the user, the basket canopy is installed at the inside of the rear seat frame in order to prevent the load from falling out.

Here, in the case in which one baby is carried and a pet is carried depending on the circumstances of the user, the basket canopy is installed at the inside of the rear seat frame, and the safety string is connected to an animal collar of the pet.

As a result, it is possible to prevent an accident in which the pet abruptly rushes out of the storage basket when the storage basket is opened.

Next, in the case in which a baby is seated on the first seat unit as if the baby were seated on a chair, the safety push bars, which are disposed at the left and right sides of the lower end of the front of the front seat frame, are simultaneously pushed in order to rotate the front seat frame in the downward direction.

At this time, the safety bar may also be used as a footrest.

Finally, in the case in which a baby is seated on the first seat unit, the front canopy can be unfolded and fixed depending on circumstances. In the case in which a baby is seated on the second seat unit, the rear canopy is unfolded and fixed depending on circumstances.

INDUSTRIAL APPLICABILITY

The present invention relates to a baby carriage having improved convenience of use configured to have a structure in which a folding seat is detachably coupled to the rear end of the baby carriage such that the baby carriage is interchangeably used in a single baby carriage mode and a twin baby carriage mode, in which the folding seat coupled to the rear end of the baby carriage is folded so as to be used as a storage space, in which a canopy is detachably coupled to the upper end of a storage basket in order to maximize a storage space and to stably support items received in the storage space, and in which a detachable basket canopy is made of a mesh material so as to be utilized as a means for transporting a pet. Consequently, the present invention has high industrial applicability.

The invention claimed is:

1. A baby carriage comprising:
 a main frame foldable or unfoldable at an intersection portion thereof through a hinge structure;
 a seat frame, which is a rectangular frame coupled to an inside of the main frame in a leftward-rightward direction, for supporting a baby carriage seat;
 a storage basket formed in a shape of a basket, having a horizontally flat seat disposed at a lower surface thereof, each of a front surface, a rear surface, a left surface, and a right surface of the storage basket being made of a mesh material for ventilation; and
 a wheel unit including a front wheel unit and a rear wheel unit, each of which including wheels respectively coupled to left and right sides of a front and a rear of the main frame in a symmetrical fashion,
 wherein the main frame comprises:
 a first front inclined frame formed so as to constitute a front of a rectangular frame having rounded corners, the first front inclined frame being inclined forwards and supporting the front wheel unit and an upper end of a front of the storage basket;
 a second front inclined frame formed so as to constitute a rear of the rectangular frame having the rounded corners, the second front inclined frame being inclined forwards;
 a rear inclined frame, which is a T-shaped frame having rotary shafts formed at front and rear sides of a front thereof, the rear inclined frame being formed in left-right symmetry so as to constitute a middle of the rectangular frame, the rear inclined frame hingedly coupling left and right sides of the first front inclined frame and the second front inclined frame to each other, the rear inclined frame being inclined rearwards, an end of a rear of the rear inclined frame being coupled to the rear wheel unit in order to support the rear wheel unit; and
 a left and a right auxiliary link frames each hingedly coupled to one side of the second front inclined frame and to one side of the rear inclined frame in left-right symmetry so as to be supported thereby,
 wherein the storage basket comprises:
 a pet gate disposed at a middle of a rear of the storage basket, the pet gate being opened or closed;

a basket canopy coupled to a lower end of an inside of a rear of the seat frame, the basket canopy including a plurality of overlapping frames, the plurality of overlapping frames being unfolded in a form of a fan in an upward direction, the plurality of overlapping frames being coupled to hooks positioned at left and right sides and a middle of an upper end of a rear of a back of a first seat unit;

a safety string, which is an elastic band having one side coupled to a middle of an inside of the lower surface of the storage basket, the safety string having a safety loop positioned at an end thereof; and a basket support frame coupled to left and right sides of a lower end of an inside of the rear inclined frame for supporting a lower surface of a rear of the storage basket.

2. The baby carriage according to claim 1, wherein the second front inclined frame comprises:

a front canopy hingedly coupled to one side of an upper end of the second front inclined frame in the leftward-rightward direction, the front canopy being configured to be unfolded about a rotary shaft in a forward direction in a form of a fan, the front canopy being installed so as to be located at an upper end of a front of the seat frame; and a rear canopy hingedly coupled to one side of a lower end of the second front inclined frame in the leftward-rightward direction, the rear canopy being configured to be-unfolded about a rotary shaft in a rearward direction in a form of a fan, the rear canopy being installed so as to be located at an upper end of a rear of the seat frame.

3. The baby carriage according to claim 1, wherein the seat frame comprises:

a seat support frame formed in a rectangular frame shape, the seat support frame being coupled to one side of an inside of the second front inclined frame in the leftward-rightward direction so as to be parallel to a ground surface;

the first seat unit, which is a chair-shaped frame coupled to one side of a front of an upper end of the seat support frame, the first seat unit comprising a seat frame coupled to a front of the seat support frame so as to be parallel thereto and a back frame formed at an upper end of a rear of the seat frame, an angle of the back frame being adjusted through a hinge structure; and a second seat unit, which is a chair-shaped frame detachably coupled to one side of a rear of the upper end of the seat support frame, the second seat unit comprising a seat frame coupled to a rear of the seat support frame so as to be parallel thereto and a back frame formed at an upper end of a rear of the seat frame, an angle of the back frame being adjusted through a hinge structure.

4. A baby carriage comprising:

a main frame foldable or unfoldable at an intersection portion thereof through a hinge structure;

a seat frame, which is a rectangular frame coupled to an inside of the main frame in a leftward-rightward direction, for supporting a baby carriage seat;

a storage basket formed in a shape of a basket, having a horizontally flat seat disposed at a lower surface thereof, each of a front surface, a rear surface, a left surface, and a right surface of the storage basket being made of a mesh material for ventilation; and a wheel unit including a front wheel unit and a rear wheel unit, each of which including wheels respectively coupled to left and right sides of a front and a rear of the main frame in a symmetrical fashion, wherein the main frame comprises:

a first front inclined frame formed so as to constitute a front of a rectangular frame having rounded corners, the first front inclined frame being inclined forwards and supporting the front wheel unit and an upper end of a front of the storage basket;

a second front inclined frame formed so as to constitute a rear of the rectangular frame having the rounded corners, the second front inclined frame being inclined forwards;

a rear inclined frame, which is a T-shaped frame having rotary shafts formed at front and rear sides of a front thereof, the rear inclined frame being formed in left-right symmetry so as to constitute a middle of the rectangular frame, the rear inclined frame hingedly coupling left and right sides of the first front inclined frame and the second front inclined frame to each other, the rear inclined frame being inclined rearwards, an end of a rear of the rear inclined frame being coupled to the rear wheel unit in order to support the rear wheel unit; and a left and a right auxiliary link frames each hingedly coupled to one side of the second front inclined frame and to one side of the rear inclined frame in left-right symmetry so as to be supported thereby, wherein the seat frame comprises:

a seat support frame formed in a rectangular frame shape, the seat support frame being coupled to one side of an inside of the second front inclined frame in the leftward-rightward direction so as to be parallel to a ground surface;

a first seat unit, which is a chair-shaped frame coupled to one side of a front of an upper end of the seat support frame, the first seat unit comprising a seat frame coupled to a front of the seat support frame so as to be parallel thereto and a back frame formed at an upper end of a rear of the seat frame, an angle of the back frame being adjusted through a hinge structure; and a second seat unit, which is a chair-shaped frame detachably coupled to one side of a rear of the upper end of the seat support frame, the second seat unit comprising a seat frame coupled to a rear of the seat support frame so as to be parallel thereto and a back frame formed at an upper end of a rear of the seat frame, an angle of the back frame being adjusted through a hinge structure, wherein the seat support frame comprises:

a seat main frame formed in a rectangular frame shape, the seat main frame being coupled to one side of the inside of the second front inclined frame in the leftward-rightward direction so as to be parallel to the ground surface, the seat main frame supporting the seat frame;

a front seat frame, which is a rectangular frame that is hingedly coupled to an inside of a front of the seat main frame in the leftward-rightward direction, a safety bar configured to be inserted between legs of a baby being coupled to a middle of a front of the front seat frame, the front seat frame supporting the first seat unit coupled to an upper end thereof; and a rear seat frame, which is a frame hingedly coupled to an inside of a rear of the seat main frame in the leftward-rightward direction, the rear seat frame supporting the second seat unit coupled to an upper end thereof.

5. The baby carriage according to claim 4, wherein a safety push bar is formed at each of left and right sides of a lower end of the front of the front seat frame, for rotating the front seat frame about a rear rotary shaft coupled to the seat main frame in a downward direction and to fix the front seat frame.

6. A baby carriage comprising:
   a main frame foldable or unfoldable at an intersection portion thereof through a hinge structure;
   a seat frame, which is a rectangular frame coupled to an inside of the main frame in a leftward-rightward direction, for supporting a baby carriage seat;
   a storage basket formed in a shape of a basket, having a horizontally flat seat disposed at a lower surface thereof, each of a front surface, a rear surface, a left surface, and a right surface of the storage basket being made of a mesh material for ventilation; and
   a wheel unit including a front wheel unit and a rear wheel unit, each of which including wheels respectively coupled to left and right sides of a front and a rear of the main frame in a symmetrical fashion,
   wherein the main frame comprises:
   a first front inclined frame formed so as to constitute a front of a rectangular frame having rounded corners, the first front inclined frame being inclined forwards and supporting the front wheel unit and an upper end of a front of the storage basket;
   a second front inclined frame formed so as to constitute a rear of the rectangular frame having the rounded corners, the second front inclined frame being inclined forwards;
   a rear inclined frame, which is a T-shaped frame having rotary shafts formed at front and rear sides of a front thereof, the rear inclined frame being formed in left-right symmetry so as to constitute a middle of the rectangular frame, the rear inclined frame hingedly coupling left and right sides of the first front inclined frame and the second front inclined frame to each other, the rear inclined frame being inclined rearwards, an end of a rear of the rear inclined frame being coupled to the rear wheel unit in order to support the rear wheel unit; and
   a left and a right auxiliary link frames each hingedly coupled to one side of the second front inclined frame and to one side of the rear inclined frame in left-right symmetry so as to be supported thereby,
   wherein the second front inclined frame comprises:
   a front canopy hingedly coupled to one side of an upper end of the second front inclined frame in the leftward-rightward direction, the front canopy being configured to be unfolded about a rotary shaft in a forward direction in a form of a fan, the front canopy being installed so as to be located at an upper end of a front of the seat frame; and
   a rear canopy hingedly coupled to one side of a lower end of the second front inclined frame in the leftward-rightward direction, the rear canopy being configured to be unfolded about a rotary shaft in a rearward direction in a form of a fan, the rear canopy being installed so as to be located at an upper end of a rear of the seat frame,
   wherein the seat frame comprises:
   a seat support frame formed in a rectangular frame shape, the seat support frame being coupled to one side of an inside of the second front inclined frame in the leftward-rightward direction so as to be parallel to a ground surface;
   a first seat unit, which is a chair-shaped frame coupled to one side of a front of an upper end of the seat support frame, the first seat unit comprising a seat frame coupled to a front of the seat support frame so as to be parallel thereto and a back frame formed at an upper end of a rear of the seat frame, an angle of the back frame being adjusted through a hinge structure; and
   a second seat unit, which is a chair-shaped frame detachably coupled to one side of a rear of the upper end of the seat support frame, the second seat unit comprising a seat frame coupled to a rear of the seat support frame so as to be parallel thereto and a back frame formed at an upper end of a rear of the seat frame, an angle of the back frame being adjusted through a hinge structure,
   wherein the seat support frame comprises:
   a seat main frame formed in a rectangular frame shape, the seat main frame being coupled to one side of the inside of the second front inclined frame in the leftward-rightward direction so as to be parallel to the ground surface, the seat main frame supporting the seat frame;
   a front seat frame, which is a rectangular frame that is hingedly coupled to an inside of a front of the seat main frame in the leftward-rightward direction, a safety bar configured to be inserted between legs of a baby being coupled to a middle of a front of the front seat frame, the front seat frame supporting the first seat unit coupled to an upper end thereof; and
   a rear seat frame, which is a frame hingedly coupled to an inside of a rear of the seat main frame in the leftward-rightward direction, the rear seat frame supporting the second seat unit coupled to an upper end thereof,
   wherein a safety push bar is formed at each of left and right sides of a lower end of the front of the front seat frame, for rotating the front seat frame about a rear rotary shaft coupled to the seat main frame in a downward direction and to fix the front seat frame, and
   wherein the storage basket comprises:
   a pet gate disposed at a middle of a rear of the storage basket, the pet gate being opened or closed;
   a basket canopy coupled to a lower end of an inside of a rear of the seat frame, the basket canopy including a plurality of overlapping frames, the plurality of overlapping frames being unfolded in a form of a fan in an upward direction, the plurality of overlapping frames being coupled to hooks positioned at left and right sides and a middle of an upper end of a rear of a back of the first seat unit;
   a safety string, which is an elastic band having one side coupled to a middle of an inside of the lower surface of the storage basket, the safety string having a safety loop positioned at an end thereof; and
   a basket support frame coupled to left and right sides of a lower end of an inside of the rear inclined frame for supporting a lower surface of a rear of the storage basket.

* * * * *